United States Patent [19]

Trenholm et al.

[11] Patent Number: 4,493,466
[45] Date of Patent: Jan. 15, 1985

[54] RISER

[75] Inventors: Bruce W. Trenholm; James G. Woolley, both of Ridgecrest, Calif.

[73] Assignee: The United States of America as represented by the Secretary of the Navy, Washington, D.C.

[21] Appl. No.: 617,139

[22] Filed: Jun. 4, 1984

Related U.S. Application Data

[63] Continuation of Ser. No. 410,285, Aug. 23, 1982, abandoned.

[51] Int. Cl.³ .............................................. B64D 17/34
[52] U.S. Cl. .................................... 244/152; 244/141; 244/148
[58] Field of Search ............... 244/142, 145, 147, 148, 244/151 R, 151 A, 151 B, 152

[56] References Cited

U.S. PATENT DOCUMENTS

| 3,498,565 | 3/1970 | Nash-Boulden | 244/152 |
| 3,779,489 | 12/1973 | Matsuo | 244/152 |
| 3,829,045 | 8/1974 | Snyder | 244/152 |
| 3,866,862 | 2/1975 | Snyder | 244/152 |
| 3,958,780 | 5/1976 | Matsuo et al. | 244/152 |
| 4,279,393 | 7/1981 | Spinks | 244/152 |

FOREIGN PATENT DOCUMENTS 585513  3/1925  France ............................... 244/152

Primary Examiner—Trygve M. Blix
Assistant Examiner—Rodney Corl
Attorney, Agent, or Firm—Robert F. Beers; W. Thom Skeer; Stephen J. Church

[57] ABSTRACT

A seat-mounted parachute employs two-way stretch material to prevent the release cord for canopy glide control from bunching or binding.

4 Claims, 4 Drawing Figures

RISER

This application is a continuation of application Ser. No. 410,285 filed Aug. 23, 1982, now abandoned.

BACKGROUND OF THE INVENTION

1. Field of the Invention

This invention pertains to the field of air safety. More particularly, the invention pertains to the field of parachutes. In still greater particularity, the invention pertains to the type of parachute which is mounted on the seat of the aviator.

2. Description of the Prior Art

Parachutes which mount on the aircraft seat mechanism are well known. Likewise, parachutes which may be converted from hemispherical canopies to modified hemispheres for gliding are well known, see, for example, U.S. Pat. Nos. 3,779,489 and 3,958,780. Heretofore these designs have been mutually exclusive.

The packing of a seat-mounted parachute requires that the canopy be removed from the seat for inspection and repacking. The removal requires the removal of the risers from the canopy. The risers in this type of parachute mounting remain with the seat.

Further, when deployed, the parachute canopy pulls the risers from the seat at a high velocity. Lanyards and other lines tend to become entangled in the riser support mechanism.

SUMMARY OF THE INVENTION

The invention provides a releasable lanyard which may be unfastened to permit parachute canopy removal. A flat compact mounting of the lanyard in a sheath on a riser minimizes entanglement by mounting hardware.

It is accordingly an object of this invention to provide an improved parachute construction.

Another object of this invention is to provide a convertible parachute construction for use in seat-mounted parachutes.

Yet another object is to provide an improved riser with a shrouded lanyard secured thereto.

These and other objects of the invention will become apparent with reference to the following description, claims, and drawings in which like parts have like numbers and;

DESCRIPTION OF THE PREFERRED EMBODIMENT

Figure 1:
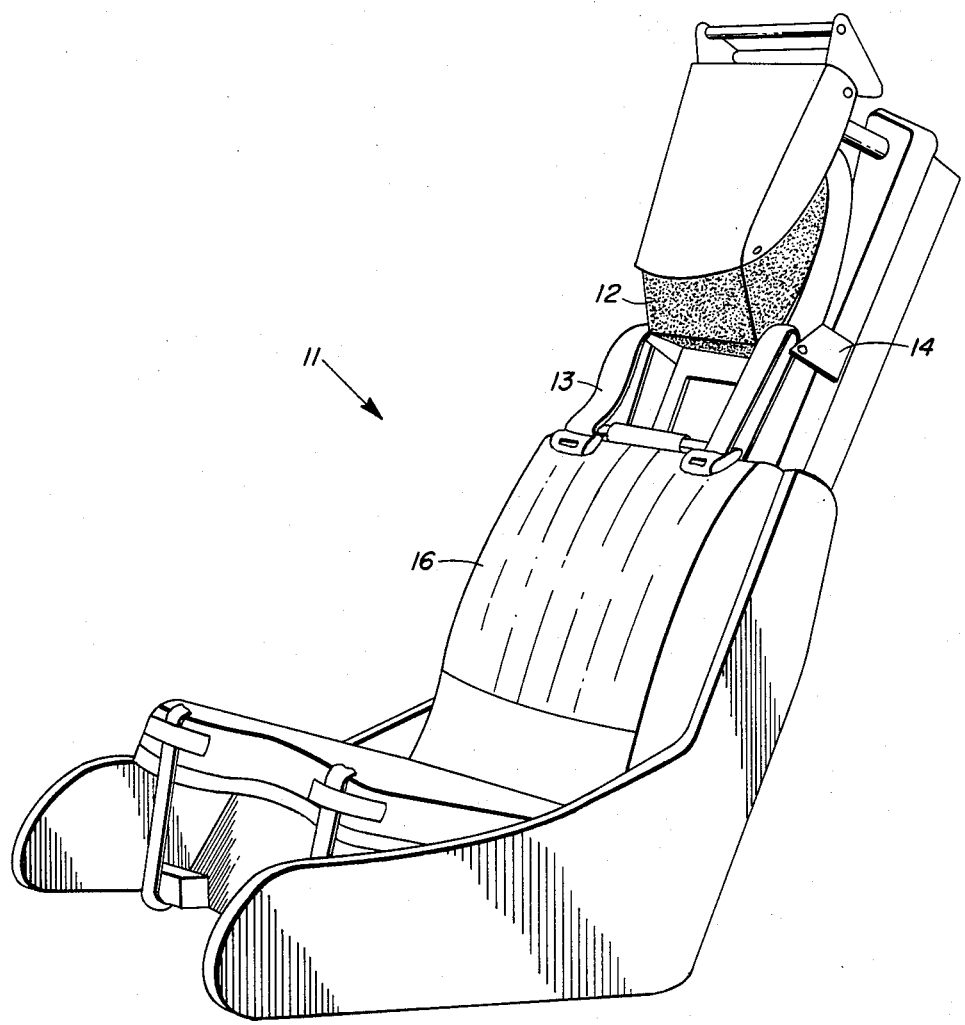
FIG. 1 is a view of the environment of the invention.

Referring to FIG. 1, an aircraft ejection seat is shown generally at 11. Seat 11, for purposes of illustration, is shown without many life support and operational attachments which are conventionally attached thereto. In its upper extremity, a parachute peak 12 is secured. The riser assembly for parachute 12 is held to seat 11 by a conventional mechanism, not shown, and terminates in shoulder straps 13 which pass through riser rollers shown at 14 and are secured beneath seat back 16.

Figure 2:
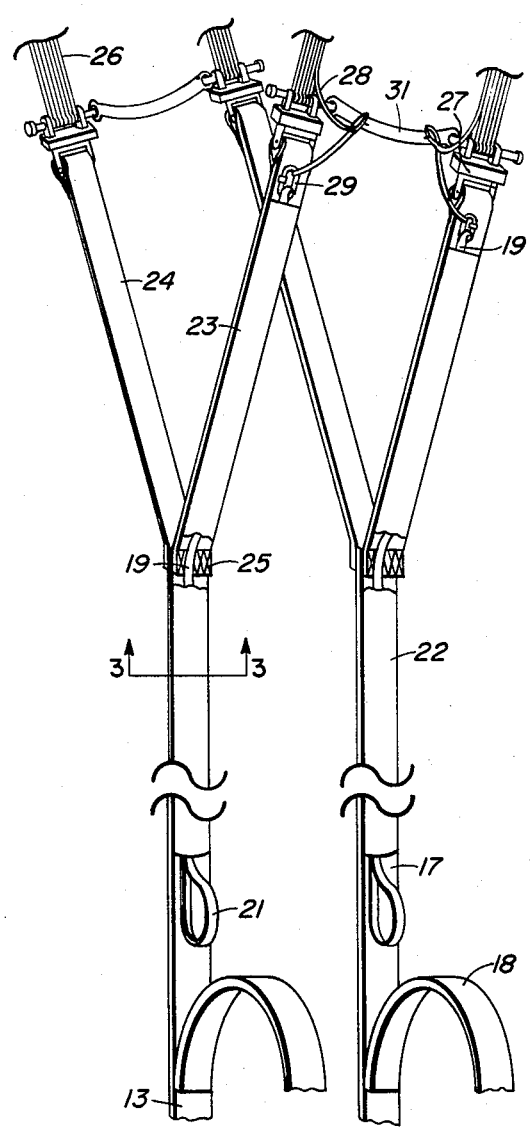
FIG. 2 is a view of the riser and lanyard mounting.

Referring to FIG. 2, the riser assembly according to the invention is shown separated from the seat for greater clarity. Shoulder straps 13 are connected to a main riser 17. Additional restraint straps 18 are firmly attached to the back of the seat at a point not shown. Upon deployment of the parachute 12, retaining straps 18 are severed by an automatic guillotine knife, not shown, which forms a part of aircraft seat 11.

A lanyard 19 has an end formed into a loop 21 and is held to main riser 17 by means of a fabric sheath 22 stitched to riser 17 along the lateral edges thereof. Sheath 22 is made of a two-way stretch fabric material. A variety of such materials are known in the art, however, that made from highly elastic synthetic fibers and marketed under the generic name "Spandex" has proven satisfactory in developmental models.

Main riser 17 splits into a rear riser 23 and a front riser 24 at a junction or junction point 25. Such construction arrangement is conventional in the parachute harness manufacturing arts. The sheath 22 extends from main riser 17 across junction point 25 to the upper end of rear riser 23, this end being disposed toward the parachute canopy when the parachute is deployed. In this manner, a low bulk sheath is provided to hold lanyard 19 against the rear surface of main riser 17 and rear riser 23. In FIG. 2 each sheath 22 is depicted as broken away in the region of the corresponding junction point. The limited elasticity of sheath 22 permits a slideable movement of lanyard 19 therein.

Rear riser 23 terminates in a conventional coupling link 27 to a plurality of parachute shroud lines or shrouds link 27 being sometimes referred to in the claims as an "attachment link." Selected ones of shrouds 26 are connected in a releasable knot or daisy chain or a lengthenable knot daisy chain as is conventional in the arts, see U.S. Pat. Nos. 3,779,489 and 3,958,780 issued to Matsuo on Dec. 18, 1973 and May 25, 1976 respectively.

Lanyard 19 is terminated by a metal fastener such as a speed link 29 which is a metal connecting link which attaches lanyard 19 to an operating or control line 28 sometimes referred to in the claims as a "release line." As shown in FIG. 2, link 29 is substantially wider transversely of the riser than the lanyard and, prior to deployment of the parachute, is in a position alongside riser 23 and between sheath 22 and the upper end of riser 23. A cross-connector strap 31 is connected to link 27 and to a similar link on the other rear riser such that the separation of the rear risers is maintained. A similar arrangement, of course, also spaces front risers 24.

In order to prevent accidental release of the shroud control, control line 28 is sewn to cross-connector strap 31. The stitches used to secure control line 28 to cross-connector strap 31 are easily broken by intentional operation of lanyard 19.

Figure 3:
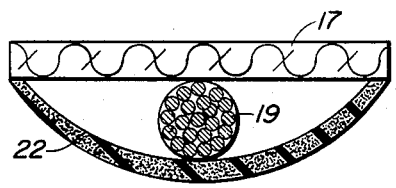
FIG. 3 is a sectional view along line 3—3 of FIG. 2.

Referring to FIG. 3, the placing of lanyard 19 between main riser 17 and sheath 22 is illustrated. Although exaggerated for the purposes of clarity, FIG. 3 illustrates the flat configuration possible permitting the combined riser assembly to pass through the riser yoke rollers 14 without danger of snagging or malfunction.

Figure 4:
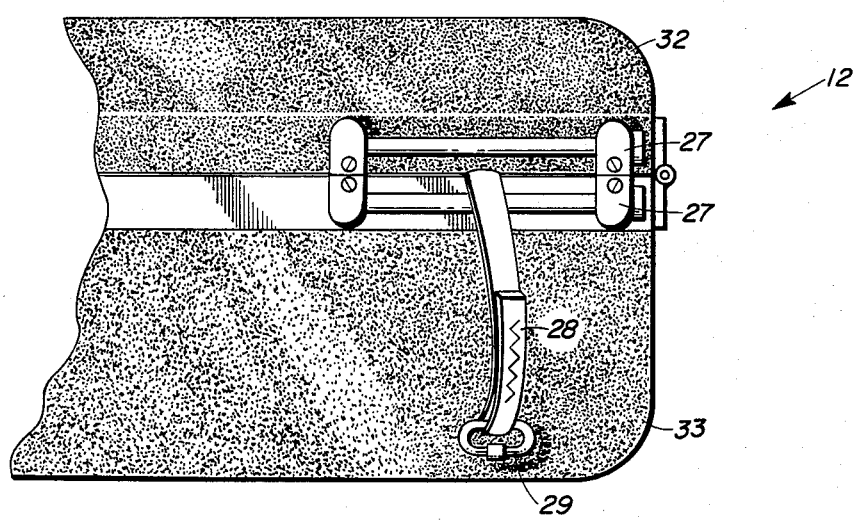
FIG. 4 is a view of the canopy package showing the control line placement.

Referring to FIG. 4, the parachute pack 12 is seen detached from risers 23 and 24 and from lanyard 19. Pack 12 includes a molded plastic case 33 and a tight-fitting lid 32. Lid 32 and case 33 are contoured at the point of closure to permit links 27 to extend therefrom such that rear riser 23 and front riser 24 may be conveniently attached thereto. Control line 28 is thus positioned to extend between the risers, placing speed link 29 in position to engage with lanyard 19.

In operation, when parachute 12 deploys, risers 23 and 24 are withdrawn from behind seat back 16. The opening of the canopy separates the front risers from the rear risers where they are spaced apart by tie lines 31. When desired to glide the hemispherical canopy, the parachutist reaches above his head and pulls loops 21 downwardly. The speed link 29 is moved downwardly away from the upper end of riser 23 and the sheath 22 expands to permit its passage. It is apparent that the use of a sheath of such two-way stretch material provides a sheath which, while of low bulk when receiving only the lanyard prior to parachute deployment, is adapted for passage of link 29 subsequent to deployment. The lateral force separates control line 28 from its tacking on cross-connector strap 31 and operates the shroud line release and expansion as is conventional in the arts.

The foregoing description, taken together with the appended claims, constitutes a disclosure sufficient to enable one skilled in the parachute manufacturing art and having the benefit of the teachings thereof to make and use the invention.

We claim:

1. A riser assembly for use in a parachute having a canopy, the assembly comprising:
    an elongated riser having a predetermined end which is disposed toward the canopy when the parachute is deployed;
    a lanyard extending along the riser from said end;
    coupling link means terminating the riser at said end for attachment of a plurality of shroud lines thereto;
    a connecting link terminating the lanyard for attachment of a control line thereto, said link being disposed, prior to deployment of the parachute, in a position alongside the riser and adjacent to said end, said link being substantially wider than the lanyard transversely of the riser; and
    a sheath of elastic material extending along the riser oppositely of the lanyard and connected to the riser along a lateral edge thereof, the sheath terminating adjacent to said end and oppositely of said position therefrom, so that the sheath minimizes entanglement of the lanyard prior to deployment of the parachute and so that the sheath expands for passage of the connecting link when the lanyard is moved away from said end subsequent to such deployment.

2. The assembly of claim 1 wherein the sheath is constructed of spandex material.

3. The assembly of claim 1 wherein said riser is one of a pair thereof extending upwardly and in diverging relation from a junction with a main riser which extends downwardly from said junction and wherein the sheath extends continuously along said one riser across the junction and along the main riser.

4. The assembly of claim 3 wherein the sheath is constructed of spandex material.

* * * * *